(12) United States Patent
Zhu et al.

(10) Patent No.: US 10,558,287 B2
(45) Date of Patent: Feb. 11, 2020

(54) PRESSURE-SENSITIVE DISPLAY TOUCH UNIT, TOUCH SCREEN, AND MANUFACTURING METHOD THEREOF

(71) Applicants: KUNSHAN NEW FLAT PANEL DISPLAY TECHNOLOGY CENTER CO., LTD., KunShan, Jiangsu (CN); KUNSHAN GO-VISIONOX OPTO-ELECTRONICS CO., LTD., KunShan, Jiangsu (CN)

(72) Inventors: Shaopeng Zhu, KunShan (CN); Yong Qiu, Beijing (CN); Hong Chen, KunShan (CN); Xiuqi Huang, KunShan (CN)

(73) Assignees: KUNSHAN NEW FLAT PANEL DISPLAY TECHNOLOGY CENTER CO., LTD., Kunshan (CN); KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 10 days.

(21) Appl. No.: 15/103,862

(22) PCT Filed: Dec. 11, 2014

(86) PCT No.: PCT/CN2014/093571
§ 371 (c)(1),
(2) Date: Jun. 13, 2016

(87) PCT Pub. No.: WO2015/085936
PCT Pub. Date: Jun. 18, 2015

(65) Prior Publication Data
US 2016/0334919 A1    Nov. 17, 2016

(30) Foreign Application Priority Data
Dec. 11, 2013   (CN) .......................... 2013 1 0668839

(51) Int. Cl.
*G06F 3/041* (2006.01)
*G06F 3/044* (2006.01)
*G06F 3/045* (2006.01)

(52) U.S. Cl.
CPC ............ *G06F 3/0416* (2013.01); *G06F 3/044* (2013.01); *G06F 3/045* (2013.01); *G06F 3/0414* (2013.01);
(Continued)

(58) Field of Classification Search
CPC ...... G06F 3/041; G06F 3/0414; G06F 3/0416; G06F 3/044; G06F 3/045;
(Continued)

(56) References Cited

U.S. PATENT DOCUMENTS 7,234,360 B2 * 6/2007 Quandt .................. G01L 1/125
73/779
8,325,143 B2 * 12/2012 Destura ................. G06F 3/0414
345/173
(Continued)

FOREIGN PATENT DOCUMENTS

CN            1841033 A     10/2006
CN          101846562 A      9/2010
(Continued)

OTHER PUBLICATIONS

G Rubio-Bollinger et al: "Carbon-fiber tips for scanning probe microscopes and molecular electronics experiments", Nanoscale Research Letters, 7(2012), May 15, 2012, pp. 1-4, XP055463929, New York.
(Continued)

*Primary Examiner* — Jason M Mandeville
(74) *Attorney, Agent, or Firm* — Maschoff Brennan

(57) ABSTRACT

A pressure-sensitive display screen touch-control unit, a touch screen and a manufacturing method thereof. The
(Continued)

touch-control unit mainly comprises a driving electrode, a lower electrode, and a dielectric layer sandwiched between the driving electrode and the lower electrode. When a pressure is applied between the driving electrode and the lower electrode, a tunnel current $I_T$ is formed, and a voltage $V_T$ exists between the driving electrode and the lower electrode. With the touch-control unit, an external pressure may be converted into a current signal to make pressure an information input mode; and the touch-control unit is combined with the existing capacitive touch screen or the resistive touch screen, such that the touch-control unit may be compatible with the existing multi-point touch function, and may also sense change in pressure sensitively. Functions of the existing touch screens may be enhanced to rich operations and applications of touch screens.

6 Claims, 1 Drawing Sheet

(52) U.S. Cl.
CPC ............. *G06F 2203/04103* (2013.01); *G06F 2203/04104* (2013.01); *G06F 2203/04105* (2013.01)

(58) Field of Classification Search
CPC . G06F 2203/04103; G06F 2203/04104; G06F 2203/04105
USPC .................................................. 345/173–174
See application file for complete search history.

(56) References Cited

U.S. PATENT DOCUMENTS

| | | | |
|---|---|---|---|
| 8,482,541 B2* | 7/2013 | Hashimoto | G06F 3/041 178/18.01 |
| 8,669,952 B2* | 3/2014 | Hashimura | B82Y 15/00 345/173 |
| 9,021,898 B2* | 5/2015 | Fuchs | G01L 1/005 73/862.381 |
| 9,152,289 B2* | 10/2015 | Nishikawa | G06F 3/045 |
| 9,281,415 B2 | 3/2016 | Bao et al. | |
| 2006/0214918 A1* | 9/2006 | Destura | G06F 3/0412 345/173 |
| 2006/0220781 A1 | 10/2006 | Kuwashima et al. | |
| 2006/0266282 A1* | 11/2006 | Doan | C23C 16/345 117/89 |
| 2008/0285210 A1 | 11/2008 | Oh | |
| 2009/0104455 A1 | 4/2009 | Chen | |
| 2010/0013784 A1 | 1/2010 | Nashiki | |
| 2010/0020041 A1* | 1/2010 | Park | G06F 3/0412 345/174 |
| 2010/0045630 A1* | 2/2010 | Gu | G06F 3/0412 345/174 |
| 2012/0062245 A1 | 3/2012 | Bao et al. | |
| 2012/0120009 A1* | 5/2012 | Lussey | G06F 3/0414 345/173 |
| 2012/0187368 A1* | 7/2012 | Cao | B82Y 15/00 257/13 |
| 2012/0256865 A1* | 10/2012 | Hashimoto | G06F 3/041 345/173 |
| 2012/0313860 A1* | 12/2012 | Hashimura | B82Y 15/00 345/173 |
| 2013/0047747 A1 | 2/2013 | Joung | |
| 2013/0293482 A1 | 11/2013 | Burns et al. | |
| 2013/0307082 A1 | 11/2013 | Manabe | |
| 2013/0319138 A1* | 12/2013 | Fuchs | G01L 1/005 73/862.625 |
| 2013/0333922 A1* | 12/2013 | Kai | G06F 3/045 174/250 |
| 2014/0197855 A1 | 7/2014 | Solin et al. | |
| 2015/0378483 A1* | 12/2015 | Tachikawa | G01L 1/2262 345/174 |

FOREIGN PATENT DOCUMENTS

| | | |
|---|---|---|
| CN | 102004573 A | 4/2011 |
| CN | 103092455 A | 5/2013 |
| CN | 103210457 A | 7/2013 |
| CN | 103250218 A | 8/2013 |
| CN | 103329084 A | 9/2013 |
| EP | 1708291 A2 | 10/2006 |
| EP | 2239651 A2 | 10/2010 |
| EP | 1708291 A2 | 10/2016 |
| JP | H02-253117 A | 10/1990 |
| JP | 2006-284208 A | 10/2006 |
| JP | 2006-294864 A | 10/2006 |
| JP | 2008-193096 A | 8/2008 |
| JP | 2009-244206 A | 10/2009 |
| JP | 2010-505088 A | 2/2010 |
| JP | 2012-137972 A | 7/2012 |
| JP | 2013-239706 A | 11/2013 |
| WO | 2011/156447 A1 | 12/2011 |
| WO | 2013/037425 A1 | 3/2013 |

OTHER PUBLICATIONS

Lu Guo, Basic physics Coursebook vol. two, Sep. 30, 1998, p. 542.

* cited by examiner

PRESSURE-SENSITIVE DISPLAY TOUCH UNIT, TOUCH SCREEN, AND MANUFACTURING METHOD THEREOF

TECHNICAL FIELD

The present invention relates to the technologies of touch control and display screens, and in particular to a pressure-sensitive display screen touch-control unit, a touch screen and a manufacturing method thereof, and a basic sensing unit used in a touch screen.

BACKGROUND

With regard to the existing touch screens, touch actions are sensed by capacitors, resistors, surface acoustic wave, optical means or the like. Surface acoustic wave touch screen (surface acoustic wave technology) is the only one of existing touch screen technologies in which touch pressure may be sensed. However, the technology, due to shortcomings such as being inapplicable to large-size screens, being too sensitive to surface contaminations, being easy to be disrupted by sound, being difficult to achieve multi-point touch and sense static pressure, or the like, cannot be applied to mainstream devices such as mobile phones, tablet computers or the like. Thus, it is hard to become a mainstream technology. The capacitive touch screen, capable of achieving multi-point touch and having high location sensitivity, is the mainstream touch screen technology at present.

Touch screens, as an important and direct input and output tool for human-machine interaction, are mostly based on two-dimensionality at present. That is, actions of a person who touches the screen in an x-y plane parallel to the screen body may be sensed. As electronic devices are becoming more intelligent and even humanized, more modes are required to be developed for human-machine interaction, for example, a mode in which a machine may be allowed to sense emotion of a person and then make an appropriate response. Applying a touch pressure on an object or on a person is a way for a person to transfer information or emotion, for example, the force applied when playing an instrument, the force applied when painting, explicit expression or implicit expression made in a manner of body touch, or the like. Based on such considerations, a technology in which pressure is regarded as another dimension for human-machine interaction has been researched, where pressure sensing becomes a novel human-machine interaction mode. This technology has broad application prospect.

SUMMARY

In view of this, a main objective of the present invention is to provide a pressure-sensitive display screen touch-control unit, a touch screen and a manufacturing method thereof. With the touch-control unit, external pressure is converted into a current signal such that pressure becomes an information input mode. In addition, the touch-control unit may also be combined with the existing capacitive touch screen or the resistive touch screen, such that the touch-control unit may be compatible with the existing multi-point touch function, and may also sense change in pressure sensitively. In addition, functions of the existing touch screens may be enhanced to rich operations and applications of touch screens.

To achieve the above objective, the technical solution of the present invention is realized as follows.

A pressure-sensitive display screen touch-control unit is provided, including a driving electrode, a lower electrode, and a dielectric layer sandwiched between the driving electrode and the lower electrode, a thickness of the dielectric layer being between 0.5 nm and 5 nm.

When a pressure is applied between the driving electrode and the lower electrode, a tunnel current $I_T$ is formed; a voltage $V_T$ exists between the driving electrode and the lower electrode; and the relation between the tunnel current $I_T$ and the voltage $V_T$—between the driving electrode and the lower electrode is:

$$I_T = CV_T \exp(-AU_0 d);$$

where, C and A are proportional constants; $U_0$ is an arithmetic mean value of escape barriers of the driving electrode and the lower electrode; and d is the thickness of the dielectric layer.

The driving electrode and the lower electrode are transparent or semi-transparent conductors, and are made from any one of indium tin oxide (ITO), aluminum-doped zinc oxide (AZO), fluorine-doped zinc oxide (FTO), gallium-doped zinc oxide (GZO), graphene and metal nanowire array.

The dielectric layer is made from polyamide, polyimide, poly(p-phenylene terephthamide), polyurea, aluminum oxide, zirconium oxide, hafnium oxide, silicon dioxide, aluminum alkoxide or Zincone.

The dielectric layer is manufactured by atomic layer deposition or molecular layer deposition.

A capacitive touch screen including the pressure-sensitive display screen touch-control unit is provided, wherein an array of the pressure-sensitive display screen touch-control unit is manufactured on a front panel of glass or polymer.

A resistive touch screen including the pressure-sensitive display screen touch-control unit is provided, wherein an array of the pressure-sensitive display screen touch-control units are manufactured on a soft substrate of the resistive touch screen, and the array is covered by an insulating film.

A method for manufacturing a pressure-sensitive display screen touch-control unit is provided, including: providing a dielectric layer sandwiched between a driving electrode and a lower electrode; and manufacturing the dielectric layer by atomic layer deposition or molecular layer deposition, a thickness of the dielectric layer being between 0.5 nm and 5 nm.

A method for manufacturing a capacitive touch screen which includes the method for manufacturing the pressure-sensitive display screen touch-control unit is provided, including: manufacturing an array of the pressure-sensitive display screen touch-control unit on a front panel made from glass or a polymer.

A method for manufacturing a resistive touch screen which includes the method for manufacturing the pressure-sensitive display screen touch-control unit is provided, including: manufacturing an array of the pressure-sensitive display screen touch-control units on a soft substrate of the resistive touch screen; and covering the array with an insulating film.

The pressure-sensitive display screen touch-control unit, the touch screen, and a manufacturing method thereof, which are provided by the present invention, have the following advantages.

(1) An external pressure may be converted into a current signal by the display screen touch-control unit, and a touch pressure may be sensed by detecting change in the current signal; in this way, the touch pressure may be sensitively detected just by receiving a touch pressure signal such that pressure may be utilized as an information input mode.

(2) The display screen touch-control unit may also be compatible with the existing capacitive touch screen and the resistive touch screen, and may be compatible with multi-point touch; by combining the touch-control unit with a capacitive touch screen or a resistive touch screen, not only a multi-point function may be achieved, but also pressure may be sensitively sensed, thereby facilitating the design and realization of highly sensitive touch-control/touch display screen with multiple functions (for example, with a force feedback function).

DETAILED DESCRIPTION

The display screen touch-control unit and a manufacturing method thereof of the present invention will be further described in detail with reference to the accompanying drawings by the embodiments of the present invention.

Figure 1:
FIG. 1 is a schematic structure diagram of a pressure-sensitive display screen touch-control unit according to the present invention.

FIG. 1 is a schematic structure diagram of a pressure-sensitive display screen touch-control unit according to the present invention. As shown in FIG. 1, a basic unit of the touch pressure sensor is described therein, which mainly includes an upper electrode (driving electrode) 101, a lower electrode 102, and an ultra-thin dielectric layer 103 sandwiched between the upper electrode 101 and the lower electrode 102. The upper electrode 101 and the lower electrode 102 are transparent or semi-transparent conductors, and are made from any one of indium tin oxide (ITO), aluminum-doped zinc oxide (AZO), fluorine-doped zinc oxide (FTO), gallium-doped zinc oxide (GZO), graphene or metal nanowire array. The general film thickness and the manufacturing method thereof are well-known in the field.

The ultra-thin dielectric layer 103 sandwiched between the upper electrode 101 and the lower electrode 102 has a thickness of between 0.5 nm and 5 nm with excellent compactness. In order to achieve properties such as compactness and defect-free, the dielectric layer 103 (which is a thin film) is manufactured by atomic layer deposition (ALD) or molecular layer deposition (MLD). The dielectric layer 103 is made from polyamide, polyimide, poly(p-phenylene terephthamide), polyurea, aluminum oxide, zirconium oxide, hafnium oxide, silicon dioxide, aluminum alkoxide or Zincone.

The working principle is as follows. The dielectric layer 103 is used as a barrier of free electrons in electrodes; since the barrier is ultra-thin, when a pressure is applied between the upper electrode 101 and the lower electrode 102, according to the principle of quantum mechanics, there is a chance for electrons to pass through the barrier to form a tunnel current $I_T$. The relation between the tunnel current $I_T$ and the voltage $V_T$ between the driving electrode and the lower electrode is:

$$I_T = CV_T \exp(-AU_0 d)$$

where, C and A are proportional constants; $U_0$ is an arithmetic mean value of the escape barriers of the driving electrode and the lower electrode; and d is the thickness of the dielectric layer 103. It may be concluded from the formula that the deformation of the ultra-thin dielectric layer 103 resulted from touch by a finger, that is, subtle changes in thickness d will affect the tunnel current $I_T$ exponentially. By detecting change in the tunnel current $I_T$, changes in touch pressure may be detected.

Figure 2:
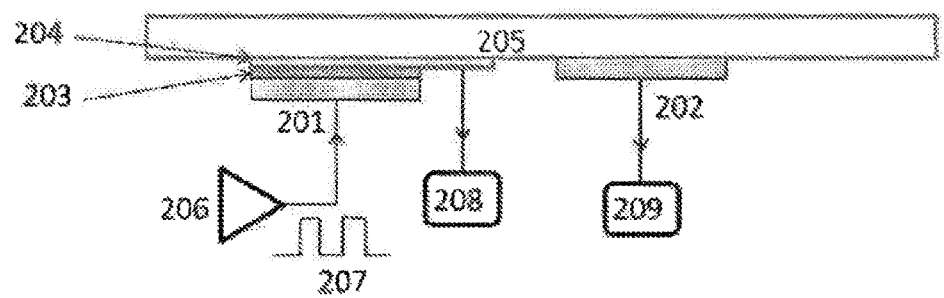
FIG. 2 is a schematic view of a touch pressure sensor which is compatible with a capacitive touch screen, according to one embodiment of the present invention.

FIG. 2 is a schematic view of a touch pressure sensor which is compatible with a capacitive touch screen, according to one embodiment of the present invention. As shown in FIG. 2, a driving electrode 201 and a receiving electrode 202 of a traditional capacitive screen are formed on a front panel 205 made from glass or a polymer.

The driving electrode 201 and the receiving electrode 202 may be made from, but not limited to, ITO, AZO or the like. ITO is preferred in this embodiment, and the manufacturing method and the parameters thereof are well-known in the field of capacitive touch screens.

As shown in FIG. 2, a driving pulse signal 207 is imposed on the driving electrode 201 by a driving buffer 206; and then charges are collected by a receiving circuit 209 through a receiving electrode 202 to sense touch actions and positions in an x-y plane.

An ultra-thin dielectric layer 203 is additionally provided below the driving electrode 201 to form an array of the pressure-sensitive display screen touch-control units together with the lower electrode 204. The dielectric layer 203 may be manufactured by atomic layer deposition (ALD) or molecular layer deposition (MLD), and may be made from, but not limited to, polyamide, polyimide, poly(p-phenylene terephthamide) (PPTA), polyurea, aluminum oxide, zirconium oxide, hafnium oxide, silicon dioxide, aluminum alkoxide and Zincone. Polyurea deposited by MLD is preferred in this embodiment; and the film thickness thereof is between 0.5 nm and 3 nm, preferably 1 nm.

A pressure is applied to the dielectric layer 203 to control the lower electrode 204 by touch. A section of the lower electrode 204 is exposed to be connected to a pressure sensing circuit 208, for sensing a current which is generated on the lower electrode 204 by the driving pulse signal 207, in order to sense the pressure. The lower electrode 204 may be made from, but not limited to, ITO, AZO or the like, preferably ITO; and with the film thickness is 50 nm to 1000 nm, preferably 100 nm.

Figure 3:
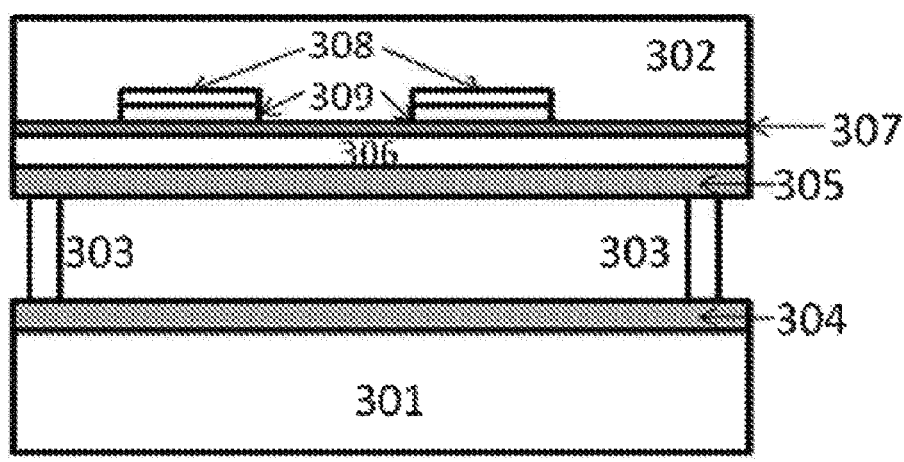
FIG. 3 is a schematic view of a touch pressure sensor which is compatible with a resistive touch screen, according to one embodiment of the present invention.

FIG. 3 is a schematic view of a touch pressure sensor which is compatible with a resistive touch screen, according to one embodiment of the present invention. As shown in FIG. 3, a basic unit of the touch sensor of the present invention is combined with a traditional resistive touch screen to form a first resistive film 304 on a hard substrate 301 of the touch screen; and the basic unit is combined with another soft substrate 302 of the touch screen by an insulating fulcrum 303. A second resistive film 305 is formed at the lowest end of the soft substrate 302. The hard substrate 301, the soft substrate 302, the insulating fulcrum 303, the first resistive film 304 and the second resistive film 305, which are mentioned above, are all manufactured by a well-known method for manufacturing a resistive touch screen. It is different from the traditional resistive touch screen in that: before the second resistive film 305 is formed, first, an array of the second electrode 308 (i.e., the driving electrode) and the ultra-thin dielectric layer 309 is formed on the soft substrate 302; and then, the first electrode 307 (i.e., the lower electrode) is formed; and finally, the array is covered by an insulating film 306.

Herein, the array of the pressure-sensitive display screen touch-control units is formed by the second electrode 308, the ultra-thin dielectric layer 309 and the first electrode 307 all together.

The second electrode 308 and the first electrode 307 may be made from, but not limited to, ITO, silver nanowire arrays, poly(3,4-ethylenedioxythiophen):poly(4-styrenesulfoate) (PEDOT:PSS) or the like, and PEDOT:PSS is preferred here; the manufacturing method thereof may be, but not limited to, inkjet printing, plasma polymerization, spin-coating, vapor vacuum deposition or the like, and inkjet printing is preferred here; and the film thickness thereof is preferably 500 nm. The insulating film 306 may be manufactured from, but not limited to, polyurea, polyimide, aluminum alkoxide or the like, and polyurea is preferred here; and the film thickness is preferably 0.8 nm and the deposition method is MLD.

When in application, a voltage is applied by the first electrode 307 to sense current of each point to be detected on the array of the second electrode 308. Thus, pressure is sensed.

The foregoing descriptions are merely preferred embodiments of the present invention, and not intended to limit the protection scope of the present invention.

What is claimed is:

1. A capacitive touch screen, comprising:
   a driving electrode and a receiving electrode formed on a front panel made from glass or a polymer;
   an ultra-thin dielectric layer, which is provided below the driving electrode; and
   a lower electrode, which is sandwiched between the driving electrode and the front panel;
   wherein a thickness of the dielectric layer being between 0.5 nm and 5 nm, the dielectric layer forming a barrier of free electrons between the driving electrode and the lower electrode;
   wherein when a pressure is applied between the driving electrode and the lower electrode, a tunnel current $I_T$ is formed; a voltage $V_T$ exists between the driving electrode and the lower electrode; and the relation between the tunnel current $I_T$ and the voltage $V_T$ between the driving electrode and the lower electrode is:

$$I_T = CV_T \exp(-AU_0 d)$$

where: C and A are proportional constants; $U_0$ is an arithmetic mean value of escape barriers of the driving electrode and the lower electrode; and d is the thickness of the dielectric layer;
   the dielectric layer is made from polyamide, polyimide, poly(p-phenylene terephthamide), polyurea, aluminum oxide, zirconium oxide, hafnium oxide, silicon dioxide, aluminum alkoxide or Zincone; and
   the dielectric layer is manufactured by atomic layer deposition or molecular layer deposition.

2. The capacitive touch screen according to claim 1, wherein the driving electrode and the lower electrode are transparent or semi-transparent conductors, and are made from any one of indium tin oxide (ITO), aluminum-doped zinc oxide (AZO), fluorine-doped zinc oxide (FTO), gallium-doped zinc oxide (GZO), graphene and metal nanowire array.

3. A resistive touch screen comprising:
   a hard substrate and a soft substrate of the touch screen;
   a first resistive film on the hard substrate;
   a second resistive film formed at the lowest end of the soft substrate;
   an insulating fulcrum between the first resistive film and the second resistive film;
   wherein an array of a driving electrode and a dielectric layer is formed on the soft substrate; and
   then a lower electrode is formed; and an insulating film covered the array is formed between the second resistive film and the lower electrode;
   wherein a thickness of the dielectric layer being between 0.5 nm and 5 nm, the dielectric layer forming a barrier of free electrons between the driving electrode and the lower electrode;
   wherein when a pressure is applied between the driving electrode and the lower electrode, a tunnel current $I_T$ is formed; a voltage $V_T$ exists between the driving electrode and the lower electrode; and the relation between the tunnel current $I_T$ and the voltage $V_T$ between the driving electrode and the lower electrode is:

$$I_T = CV_T \exp(-AU_0 d)$$

where: C and A are proportional constants; $U_0$ is an arithmetic mean value of escape barriers of the driving electrode and the lower electrode; and d is the thickness of the dielectric layer;
   the dielectric layer is made from polyamide, polyimide, poly(p-phenylene terephthamide), polyurea, aluminum oxide, zirconium oxide, hafnium oxide, silicon dioxide, aluminum alkoxide or Zincone; and
   the dielectric layer is manufactured by atomic layer deposition or molecular layer deposition.

4. The resistive touch screen according to claim 3, wherein the driving electrode and the lower electrode are transparent or semi-transparent conductors, and are made from any one of indium tin oxide (ITO), aluminum-doped zinc oxide (AZO), fluorine-doped zinc oxide (FTO), gallium-doped zinc oxide (GZO), graphene and metal nanowire array.

5. A method for manufacturing a resistive touch screen as defined in claim 3, the method comprising:
   forming the first resistive film on the hard substrate of the touch screen;
   forming the second resistive film at the lowest end of the soft substrate;
   combining the soft substrate and the hard substrate by an insulating fulcrum;
   wherein before the second resistive film is formed, first, an array of the driving electrode and the ultra-thin dielectric layer is formed on the soft substrate; and then, the lower electrode is formed; and finally, the array is covered by an insulating film; and
   manufacturing the dielectric layer by atomic layer deposition or molecular layer deposition, a thickness of the dielectric layer being between 0.5 nm and 5 nm;
   wherein the dielectric layer is made from polyamide, polyimide, poly(p-phenylene terephthamide), polyurea, aluminum oxide, zirconium oxide, hafnium oxide, silicon dioxide, aluminum alkoxide or Zincone.

6. A method for manufacturing a resistive touch screen according to claim 5, wherein the driving electrode and the lower electrode are transparent or semi-transparent conductors, and are made from any one of indium tin oxide (ITO), aluminum-doped zinc oxide (AZO), fluorine-doped zinc oxide (FTO), gallium-doped zinc oxide (GZO), graphene and metal nanowire array.

* * * * *